(12) United States Patent
Hwang et al.

(10) Patent No.: US 11,258,118 B2
(45) Date of Patent: Feb. 22, 2022

(54) BATTERY PACK HAVING HEAT DISSIPATING MEMBER

(71) Applicant: LG CHEM, LTD., Seoul (KR)

(72) Inventors: Seong-Ju Hwang, Daejeon (KR); Jae-Young Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 197 days.

(21) Appl. No.: 16/683,755

(22) Filed: Nov. 14, 2019

(65) Prior Publication Data

US 2020/0176836 A1 Jun. 4, 2020

(30) Foreign Application Priority Data

Nov. 29, 2018 (KR) .................. 10-2018-0151273

(51) Int. Cl.

| | |
|---|---|
| *H01M 10/6551* | (2014.01) |
| *H01M 10/643* | (2014.01) |
| *H01M 50/213* | (2021.01) |
| *H01M 50/502* | (2021.01) |
| *H01M 10/42* | (2006.01) |
| *H01M 10/48* | (2006.01) |
| *H01M 10/613* | (2014.01) |

(52) U.S. Cl.
CPC ..... *H01M 10/6551* (2015.04); *H01M 10/425* (2013.01); *H01M 10/48* (2013.01); *H01M 10/613* (2015.04); *H01M 10/643* (2015.04); *H01M 50/213* (2021.01); *H01M 50/502* (2021.01)

(58) Field of Classification Search
CPC .......................... H01M 10/643; H01M 50/213
See application file for complete search history.

(56) References Cited

U.S. PATENT DOCUMENTS

| | | | |
|---|---|---|---|
| 2009/0297892 A1 | 12/2009 | Ijaz et al. | |
| 2011/0262777 A1* | 10/2011 | Choi ................... | H01M 50/502 |
| | | | 429/7 |
| 2012/0100400 A1 | 4/2012 | Kang et al. | |
| 2013/0260212 A1 | 10/2013 | Kohno et al. | |

(Continued)

FOREIGN PATENT DOCUMENTS

| | | |
|---|---|---|
| CN | 204391166 U | 6/2015 |
| JP | 2001-155702 A | 6/2001 |
| JP | 5135071 B2 | 1/2013 |

(Continued)

OTHER PUBLICATIONS

Office Action dated May 21, 2021, issued in corresponding Korean Patent Application No. 10-2018-0151273.

*Primary Examiner* — Jonathan Crepeau
(74) *Attorney, Agent, or Firm* — Morgan, Lewis & Bockius LLP

(57) ABSTRACT

Disclosed is a battery pack with enhanced cooling efficiency. The battery pack includes a plurality of battery cells respectively having electrode terminals formed thereon; a bus bar plate having a connection portion protrusively extending toward the electrode terminal to contact the electrode terminal to be electrically connected to the electrode terminal; and a heat dissipating member between the bus bar plate and the battery cell and having a connection hole into which the connection portion of the bus bar plate is inserted.

10 Claims, 8 Drawing Sheets

(56) References Cited

U.S. PATENT DOCUMENTS

2019/0067655 A1* 2/2019 Nakamura .......... H01M 10/613

FOREIGN PATENT DOCUMENTS

| JP | 5624157 B2 | 11/2014 |
| KR | 10-2010-0135601 A | 12/2010 |
| KR | 10-1633943 B1 | 6/2016 |
| KR | 10-2018-0023699 A | 3/2018 |

* cited by examiner

BATTERY PACK HAVING HEAT DISSIPATING MEMBER

The present application claims priority to Korean Patent Application No. 10-2018-0151273 filed on Nov. 29, 2018 in the Republic of Korea, the disclosures of which are incorporated herein by reference.

BACKGROUND

Technical Field

The present disclosure relates to a battery pack having a heat dissipating member, and more particularly, to a method for manufacturing a battery pack to enhance the cooling efficiency.

Discussion of the Related Art

Recently, the demand for portable electronic products such as notebook computers, video cameras and portable telephones has increased sharply, and electric vehicles, energy storage batteries, robots, satellites and the like have been developed in earnest. Accordingly, high-performance secondary batteries allowing repeated charging and discharging are being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. Also, the lithium secondary battery includes an electrode assembly in which a positive electrode plate coated with the positive electrode active material and a negative electrode plate coated with the negative electrode active material are disposed with a separator being interposed therebetween, and an exterior for hermetically containing the electrode assembly together with an electrolyte.

In using the secondary battery, it is very important to check the temperature, current and voltage of the secondary battery in order to prevent the occurrence of safety accidents and improve the life cycle of the secondary battery.

That is, as the performance of an electronic device is improved day by day, the performance of the secondary battery for supplying a high output power at one time is also improving. In particular, the secondary battery used for the high-output electronic device has very large heat generation, which may cause an accident such as ignition or explosion if the temperature rise is not properly handled.

To this end, a battery management unit applied to the electronic device may include a temperature element used for measuring the temperature of a plurality of secondary batteries, such as a negative temperature coefficient (NTC) device and a positive temperature coefficient (PTC) device.

In addition, a related art battery pack includes a bus bar plate with electric conductivity to electrically connect the plurality of secondary batteries in series or in parallel. Moreover, generally, the bus bar plate is electrically connected to a protective circuit module to control the charging and discharging of the plurality of secondary batteries or to transfer the power of the plurality of secondary batteries to an external electronic device through external input/output terminals.

Recently, the bus bar plate provided in the battery pack is generally contacted and connected to the electrode terminals of the secondary battery by resistance welding.

However, the welding portion between the electrode terminal and the bus bar plate has a relatively higher electrical resistance than the other portions, thereby causing a great heat generation due to the charging and discharging of the battery pack. Accordingly, the conventional battery pack increases the internal temperature in a short time during operation, thereby shortening the time for continuously using the battery pack and reducing the life cycle due to easily degradation of the battery pack.

SUMMARY

Accordingly, embodiments of the present disclosure are directed to a battery pack having a heat dissipating member that substantially obviates one or more of the problems due to limitations and disadvantages of the related art.

The present disclosure is designed to solve the problems of the related art, and therefore the present disclosure is directed to providing a battery pack, which may improve the cooling efficiency (or, the heat dissipating efficiency) of a bus bar plate or a battery cell.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

In one aspect of the present disclosure, there is provided a battery pack, comprising: a plurality of battery cells respectively having electrode terminals formed thereon; a bus bar plate having a connection portion protrusively extending toward the electrode terminal to contact the electrode terminal so as to be electrically connected to the electrode terminal; and a heat dissipating member interposed between the bus bar plate and the battery cell and having a connection hole into which the connection portion of the bus bar plate is inserted.

Also, the battery cell may be a cylindrical battery cell having a first electrode terminal and a second electrode terminal with different polarities respectively formed at both end surfaces thereof.

Moreover, the heat dissipating member may be provided in plural, and the plurality of heat dissipating members may be respectively located at both ends of the battery cell at which the first electrode terminal or the second electrode terminal are provided.

In addition, the bus bar plate may include a heat dissipating portion extending outward from an outer circumference of the connection portion to face an outer surface of the heat dissipating member.

Further, the heat dissipating member may have a circular pad form.

Also, the heat dissipating member may include a heat-resisting portion located in the circular pad form to contact the connection hole and having a heat-resisting material; and a heat-absorbing portion formed outer than the heat-resisting portion based on a center in the circular pad form and having a heat-absorbing material.

Moreover, the heat dissipating member may further include an extending portion extending inward from an outer circumference of the circular pad form along an outer surface of the cylindrical battery cell.

Also, the battery pack may further comprise a protective circuit module.

Further, the protective circuit module may include a printed circuit board on which a conductive wire pattern is formed; and a voltage sensing unit having a conductive wire to measure a voltage of the battery cell, and the bus bar plate may include a sensing portion electrically connected to the conductive wire of the voltage sensing unit and protrusively extending outward from a portion of an outer circumference of the heat dissipating portion.

Further, the connection portion may have a slit formed to elongate in one direction.

In addition, the battery pack may further comprise an insulating pad made of an electrically insulating material and located in close contact with an outer surface of the bus bar plate.

In another aspect of the present disclosure, there is also provided an electronic device, comprising the battery pack.

In another aspect of the present disclosure, there is also provided a vehicle, comprising the battery pack.

According to an embodiment of the present disclosure, the battery pack of the present disclosure has a heat dissipating member interposed between the bus bar plate and the battery cell, thereby effectively absorbing the heat generated at the joining portion between the electrode terminal and the bus bar generate where relatively more heat is generated than the other portions of the battery pack. Accordingly, it is possible to further enhance the cooling effect of the battery pack.

Also, according to an embodiment of the present disclosure, if the heat dissipating portion configured to face the outer surface of the heat dissipating member is provided to the bus bar plate, the contact area between the heat dissipating member and the bus bar plate may be maximized, thereby further enhancing the heat dissipating efficiency of the battery pack.

Moreover, according to another embodiment of the present disclosure, since the heat dissipating member has a heat-resisting portion and a heat-absorbing portion, when the connection portion of the bus bar plate and the electrode terminal are welded, the heat-resisting portion may prevent the heat dissipating member from being thermally damaged (deformed) due to the welding heat. In addition, the heat-absorbing portion has a relatively higher heat absorbing property than the heat-resisting portion, thereby improving the heat dissipating characteristic of the heat dissipating member.

Further, according to another embodiment of the present disclosure, since the fixing protrusion formed on the heat dissipating member is configured to be inserted into the clamping portion of the battery can, the heat dissipating member may be easily fixed to one side or the other side of the cylindrical battery cell, and a fixing member or an adhesive is not required, thereby effectively increasing the process efficiency. Also, the heat dissipating member may effectively increase the coupling force with the outer surface of the cylindrical battery cell.

In addition, according to another embodiment of the present disclosure, the battery pack of the present disclosure further includes an insulating pad interposed between the bus bar plate and the heat dissipating plate, thereby effectively transferring that the heat generated at the joining portion of the bus bar plate and the electrode terminal, at which relatively high heat is generated, to the outside. Accordingly, it is possible to further enhance the cooling effect of the battery pack.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated in a constitute a part of this application, illustrate embodiments of the present disclosure and together with the description serve to serve to explain features and principles of the present disclosure.

DETAILED DESCRIPTION

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
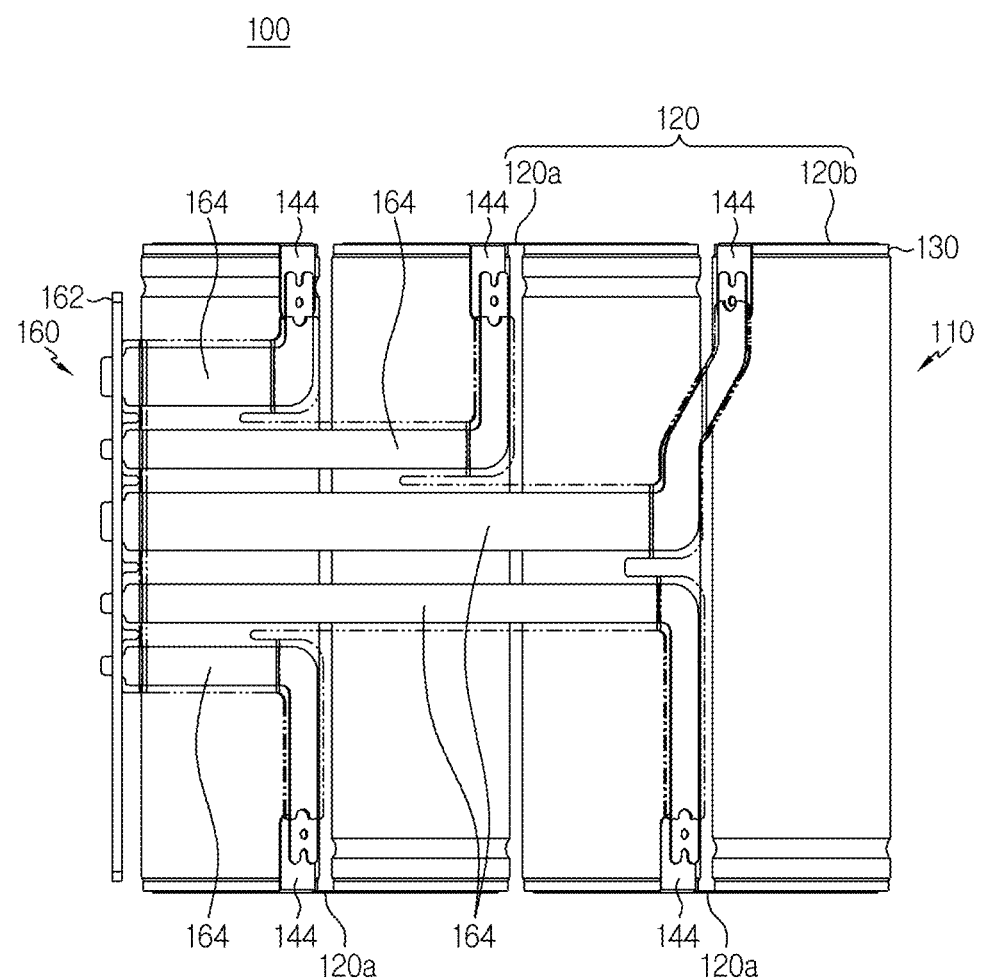
FIG. 1 is a plane view schematically showing components of a battery pack according to an embodiment of the present disclosure.
Figure 2:
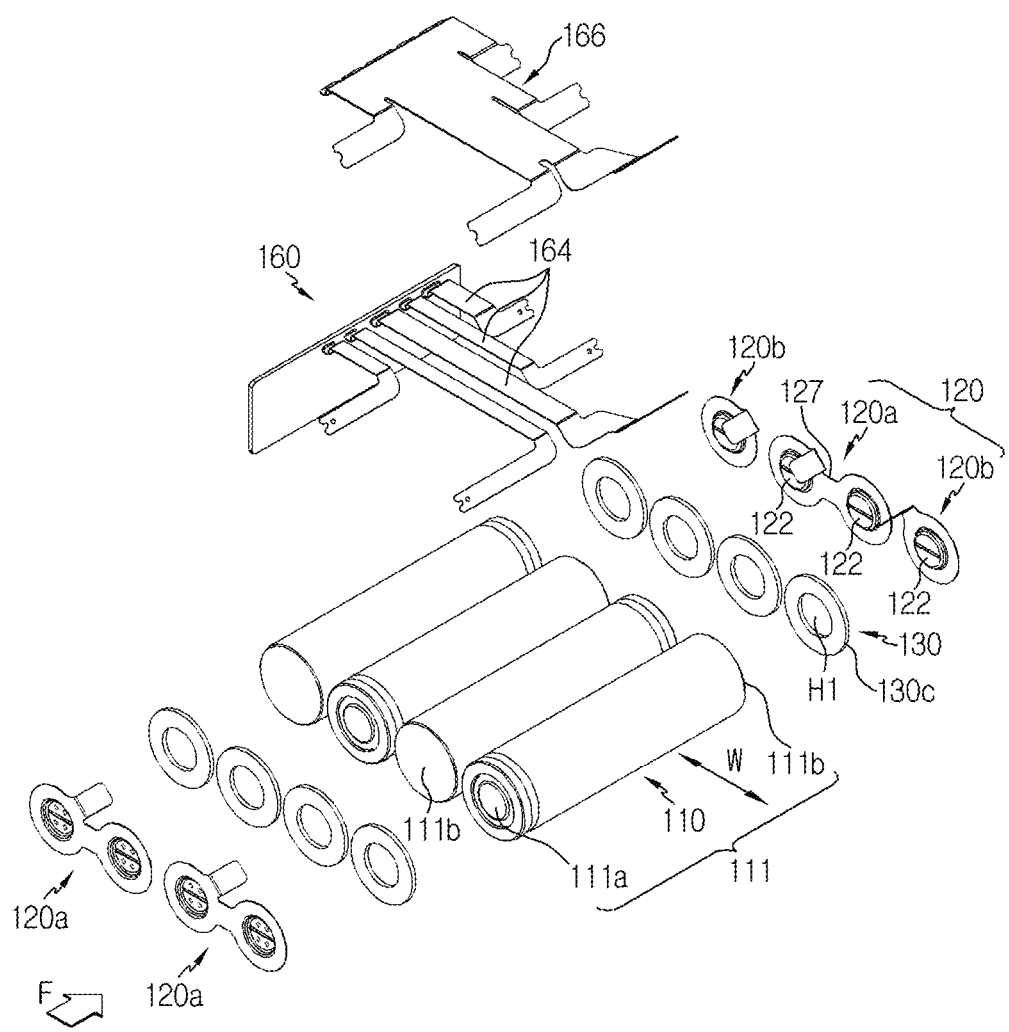
FIG. 2 is an exploded perspective view schematically showing disassembled components of the battery pack according to an embodiment of the present disclosure.

FIG. 1 is a plane view schematically showing components of a battery pack according to an embodiment of the present disclosure. FIG. 2 is an exploded perspective view schematically showing disassembled components of the battery pack according to an embodiment of the present disclosure. Also, FIG. 3 is a partially sectioned view schematically showing a partial internal structure of a cylindrical battery cell, employed at the battery pack of FIG. 2.

Figure 3:
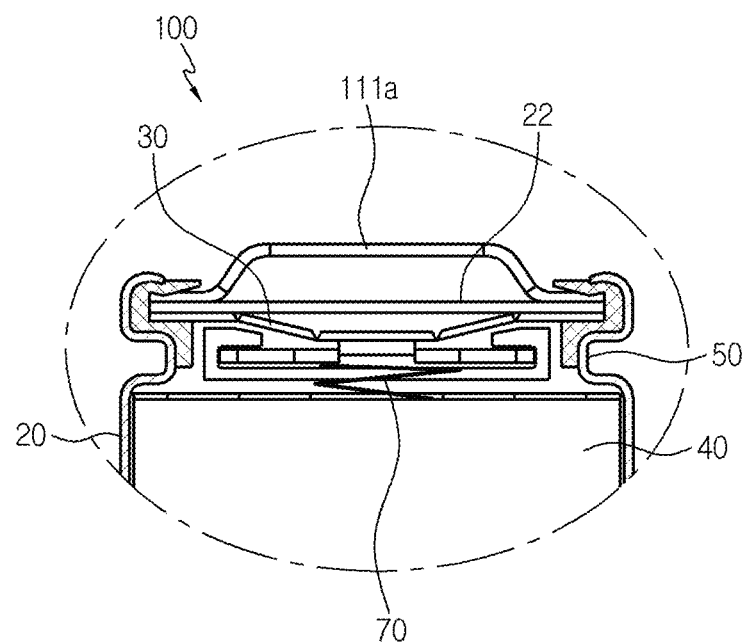
FIG. 3 is a partially sectioned view schematically showing a partial internal structure of a cylindrical battery cell, employed at the battery pack of FIG. 2.

With reference to FIGS. 1 to 3, a battery pack 100 according to an embodiment of the present disclosure may include a plurality of battery cells 110, a bus bar plate 120, a protective circuit module 160, and a heat dissipating member 130.

Specifically, the battery cell 110 may be a cylindrical battery cell 110. Here, the cylindrical battery cell 110 may include a cylindrical battery can 20 and an electrode assembly 40 (see FIG. 3) accommodated in the battery can 20. For example, as shown in FIG. 3, the battery cell 110 includes a positive electrode tab 70 provided therein and electrically connected to the electrode assembly 40.

Here, the battery can 20 may include a material with high electric conductivity. For example, the battery can 20 may include an aluminum or copper material. In addition, when viewed in the F direction, the battery can 20 may be configured to lie down long in the front and rear direction. In addition, the battery can 20 may have a cylindrical shape extending in the front and rear direction. Further, electrode terminals 111 may be formed at both front and rear ends of the battery can 20, respectively.

Meanwhile, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Specifically, a first electrode terminal 111a having a flat circular shape and protruding outward may be formed at an front end surface of the battery can 20, and a second electrode terminal 111b having a flat circular shape may be formed at a rear end surface of the battery can 20.

With reference to FIG. 3 again along with FIG. 2, the electrode terminal 111a may be formed at the cylindrical battery cell 110 in the form of a protruding top cap. In addition, the cylindrical battery cell 110 may include a safety element 22 (for example, a positive temperature coefficient (PTC) element, a thermal cutoff (TCO), or the like) at a lower portion thereof to block a current by greatly increasing the battery resistance when the temperature inside the battery cell 110 rises. In addition, the cylindrical battery cell 110 may have a safety vent structure 30, which is shaped to protrude downward in a normal state but is protruded and ruptured when the pressure inside the battery increases to exhaust gas. Further, the battery can 20 may have a clamping portion 50 recessed inward.

However, the battery pack 100 according to the present disclosure may adopt various kinds of cylindrical battery cells 110 known at the time of filing this application, without being limited to the cylindrical battery cell 110 described above.

Further, the cylindrical battery cells 110 may be arranged in a plurality of columns and/or rows in the horizontal direction. Here, the horizontal direction may mean a direction parallel to the ground when the cylindrical battery cells 110 are placed on the ground, and may also be referred to as at least one direction on a plane perpendicular to the vertical direction.

For example, as shown in FIG. 2, the battery pack 100 may include a plurality of cylindrical battery cell 110 arranged in four columns in the left and right direction W.

Further, the bus bar plate 120 may be configured to contact the electrode terminals 111 of the plurality of cylindrical battery cells 110 to electrically connect the electrode terminals 111a, 111b. In addition, the bus bar plate 120 may include a metal with high electric conductivity. For example, the metal may be aluminum, copper, aluminum alloy, or copper alloy.

Moreover, the bus bar plate 120 may include a connection portion 122 to be in electrical contact with the electrode terminal 111. In addition, the connection portion 122 may have a portion protrusively protruding toward the electrode terminal 111 to contact the electrode terminal 111.

Specifically, one side portion (a left portion) of the bus bar plate 120 based on the center thereof may be in contact with the first electrode terminal 111a of one cylindrical battery cell 110 and the other side portion (a right portion) thereof may be in contact with the second electrode terminal 111b of another cylindrical battery cell 110 such that the first electrode terminal 111a of one cylindrical battery cell 110 and the second electrode terminal 111b of another cylindrical battery cell 110 are electrically connected. In addition, the bus bar plate 120 of another type may be configured to be connected to only one electrode terminal 111.

For example, as shown in FIG. 2, the battery pack 100 may include five bus bar plates 120. In addition, the connection portion 122 at one side of three bus bar plate 120 among the five bus bar plates 120 may be in contact with the first electrode terminal 111a of one cylindrical battery cell 110, and the connection portion 122 at the other side thereof may be in contact with the second electrode terminal 111b of another cylindrical battery cell 110. Also, the remaining two bus bar plates 120 may be configured to be in electrical contact with the first electrode terminal 111a or the second electrode terminal 111b of one cylindrical battery cell 110.

In addition, the bus bar plate 120 may have a shape corresponding to one end surface or the other end surface on which the electrode terminal 111 of the cylindrical battery cell 110 is formed. For example, if one end surface or the other end surface of the cylindrical battery cell 110 is circular, the bus bar plate 120 may have at least one circular plate portion.

Further, the bus bar plate 120 may have a connection portion 127 extending from the plurality of circular plate portions and connected to each other. For example, as shown in FIG. 2, the bus bar plate 120 may have two circular plate portions. Further, the bus bar plate 120 may have a connection portion 127 for connecting the two circular plate portions to each other. In addition, a connection portion 122 may be formed at each of the two circular plate portions. Further, another type of bus bar plate 120 may have one circular plate portion, and the connection portion 122 may be formed at the circular plate portion.

Further, the bus bar plate 120 may be located on one end surface or the other end surface on which the electrode terminal 111 of the cylindrical battery cell 110 is formed. For example, as shown in FIG. 2, five bus bar plates 120 may be configured to electrically connect four cylindrical battery cells 110 in series.

In addition, the heat dissipating member 130 may have a circular pad form 130c as a whole. Also, the heat dissipating member 130 may be positioned to be interposed between the bus bar plate 120 and the battery cell 110. Further, the heat dissipating member 130 may have a connection hole H1 so that the connection portion 122 of the bus bar plate 120 is inserted therein. In addition, the heat dissipating member 130 may include an electrically insulating material and/or a thermally conductive material at least partially. For example, the electrically insulating material may be polyimide. Further, the thermally conductive material may be a silicon-based polymer, a urethane-based polymer, or a ceramic material.

In addition, the heat dissipating member 130 may be provided in plural, and the plurality of heat dissipating members 130 may be respectively located at both ends of the battery cell 110 at which the first electrode terminal 111*a* or the second electrode terminal 111*b* is provided.

For example, as shown in FIG. 1, eight heat dissipating members 130 may be positioned to be interposed between the bus bar plate 120 and the battery cells 110. The connection portion 122 formed at each of the five bus bar plates 120 may be inserted into the connection hole H1 formed in each of the eight heat dissipating members 130.

Thus, according to this configuration of the present disclosure, since the heat dissipating member 130 is interposed between the bus bar plate 120 and the battery cell 110, it is possible to effectively absorb the heat generated at the joining portion between the electrode terminal 111 and the bus bar plate 120 where relatively greater heat is generated than other portions of the battery pack 100. Accordingly, the cooling effect of the battery pack 100 may be further enhanced.

Figure 4:
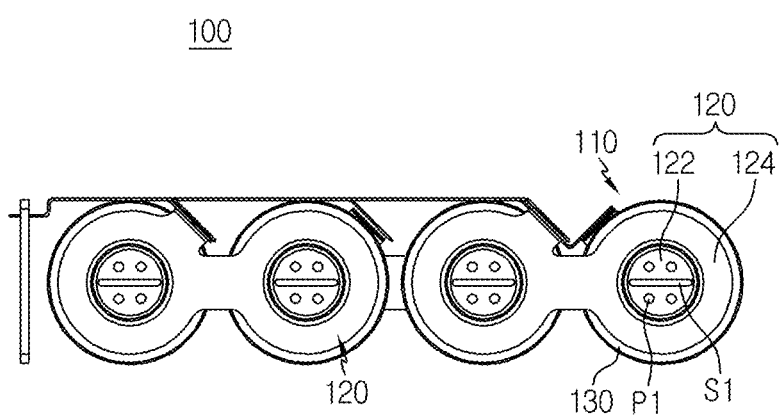
FIG. 4 is a front view schematically showing components of the battery pack according to an embodiment of the present disclosure.

FIG. 4 is a front view schematically showing components of the battery pack according to an embodiment of the present disclosure.

With reference to FIG. 4 along with FIG. 2, the bus bar plate 120 may include a heat dissipating portion 124 configured to face the outer surface of the heat dissipating member 130. Specifically, the heat dissipating portion 124 may be shaped to extend outward from an outer circumference of the connection portion 122 of the bus bar plate 120. That is, the heat dissipating portion 124 of the heat dissipating member 130 may be formed in a size corresponding to the area of the heat dissipating member 130.

For example, as shown in FIG. 4, the heat dissipating portion 124 may extend in all directions from the outer circumference of the connection portion 122 of the bus bar plate 120. In addition, if the outer circumference of the connection portion 122 is circular, the heat dissipating portion 124 may also have a circular shape. Also, the heat dissipating portion 124 may be formed to have a somewhat smaller area than the heat dissipating member 130.

Thus, according to this configuration of the present disclosure, if the bus bar plate 120 has the heat dissipating portion 124 configured to face the outer surface of the heat dissipating member 130, the contact area between the heat dissipating member 130 and the bus bar plate 120 may be maximized, thereby further enhancing the heat dissipating efficiency.

In addition, a slit S1 elongating in one direction may be formed at the connection portion 122. Also, a welding point P1 for resistance welding between the connection portion 122 and the electrode terminal 111 may be formed at the connection portion 122. For example, as shown in FIG. 4, two connection portions 122 may be formed at one bus bar plate 120. In addition, the slit S1 and the welding point P1 may be formed at each of the two connection portions 122.

Thus, according to this configuration of the present disclosure, since the slit S1 elongated in one direction is formed at the connection portion 122, if a welding rod of a resistance welder (not shown) comes into contact with the welding points P1 formed at both sides of the slit S1, electricity may flow efficiently through the electrode terminal 111 between the welding points P1 formed at both sides, thereby effectively increasing the welding efficiency.

Figure 5:
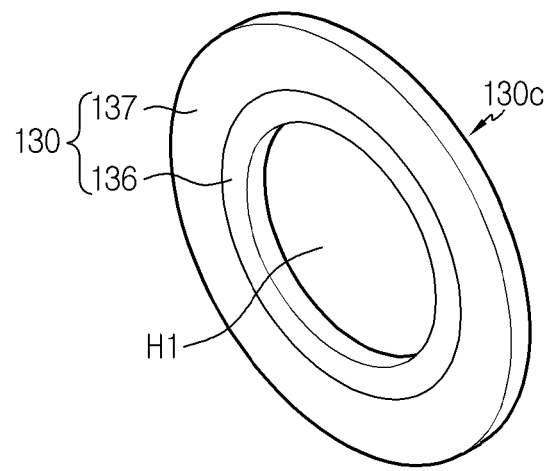
FIG. 5 is a perspective view schematically showing a heat dissipating member, employed at the battery pack according to another embodiment of the present disclosure.

FIG. 5 is a perspective view schematically showing a heat dissipating member, employed at the battery pack according to another embodiment of the present disclosure.

With reference to FIG. 5 along with FIG. 2, the heat dissipating member 130 may include a heat-resisting portion 136 and a heat-absorbing portion 137, unlike the heat dissipating member 130 of FIG. 2.

Specifically, the heat dissipating member 130 may have a circular pad form 130*c* as a whole. Also, the heat-resisting portion 136 may be formed closer to the center of the circular pad than the heat-absorbing portion 137 so as to contact the connection hole H1. That is, the heat-resisting portion 136 may be formed to surround the connection hole H1.

In addition, the heat-resisting portion 136 may include a heat-resisting material. Here, the heat-resisting means the property in which whole physical properties at room temperature does not fall remarkably even at high temperature. For example, the heat-resisting material may be polyetheretherketone (PEEK), polyethersulfone (PES), polyimide (polyimide, polyamideimide, polyetherimide, PI), polyphenylenesulfide (PPS), or the like. For example, the heat-resisting material may not change physical properties from the room temperature up to 400° C.

Further, the heat-absorbing portion 137 may be formed outer than the heat-resisting portion 136 based on the center of the circular pad 130*d*. Also, the heat-absorbing portion 137 may include a heat-absorbing material with a higher heat-absorbing property than the heat-resisting portion 136. Here, the heat-absorbing means the property accompanied with heat absorption.

For example, the heat-absorbing material may be metal particles. For example, the heat-absorbing material may be powder of metal oxide such as alumina, titanium oxide, or the like. More specifically, the heat-absorbing material may be included in the form of a filler in a substrate made of an electrically insulating material.

For example, as shown in FIG. 5, the heat dissipating member 130 may include a heat-resisting portion 136 and a heat-absorbing portion 137. For example, the heat-resisting portion 136 may be positioned to contact the connection hole H1 of the circular pad 130*c*. Also, the heat-resisting portion 136 may include polyimide at least partially. In addition, the heat-absorbing portion 137 may be formed outer than the heat-resisting portion 136 and may have a form in which an alumina filler is included in a silicon polymer.

Thus, according to this configuration of the present disclosure, since the heat dissipating member 130 includes the heat-resisting portion 136 and the heat-absorbing portion 137, when the connection portion 122 of the bus bar plate 120 and the electrode terminal 111 are welded, the heat-resisting portion 136 may prevent the heat dissipating member 130 from being thermally damaged due to welding heat. In addition, the heat-absorbing portion 137 has a relatively higher heat-absorbing property than the heat-resisting portion 136, thereby improving the heat dissipating characteristic of the heat dissipating member 130.

Figure 6:
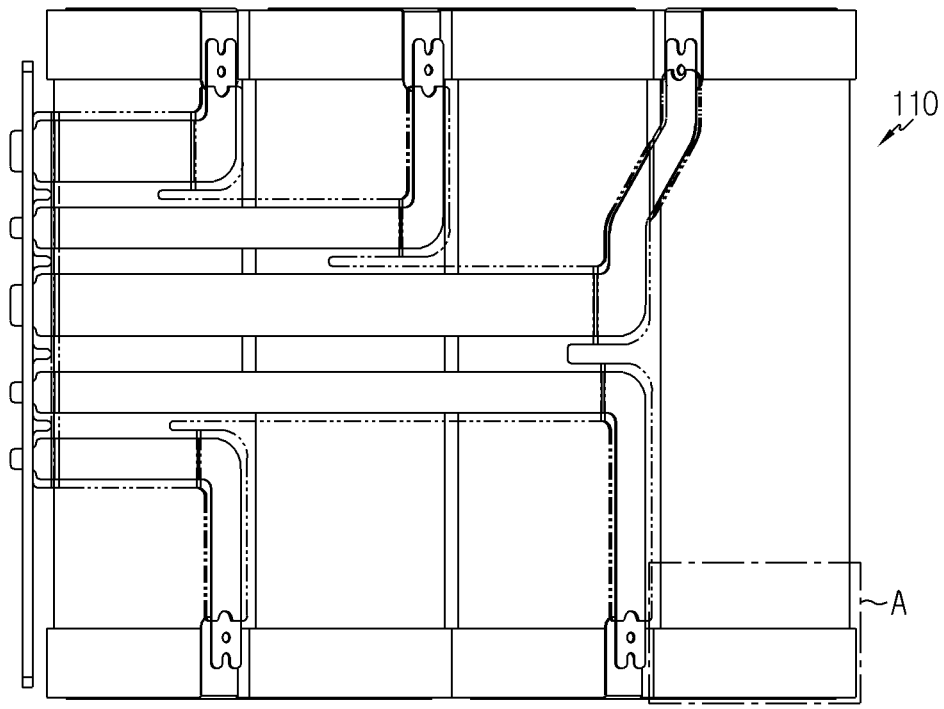
FIG. 6 is a plane view schematically showing a battery pack according to another embodiment of the present disclosure.
Figure 7:
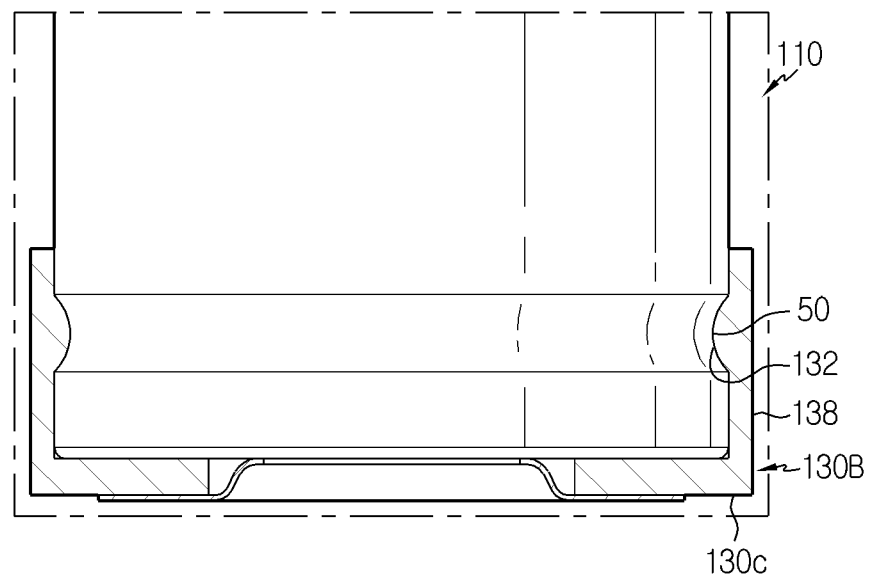
FIG. 7 is a partial plane view schematically showing a portion of a region A of the battery pack depicted in FIG. 6 in an enlarged form.
Figure 8:
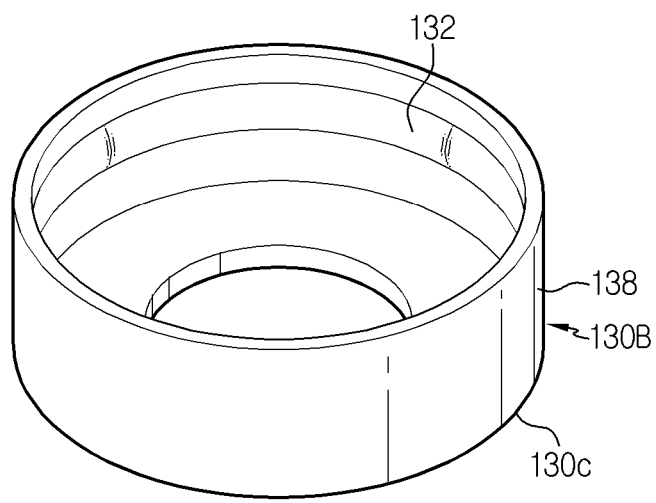
FIG. 8 is a perspective view schematically showing a heat dissipating member, employed at the battery pack of FIG. 6.

FIG. 6 is a plane view schematically showing a battery pack according to another embodiment of the present disclosure. FIG. 7 is a partial plane view schematically showing a portion of a region A of the battery pack depicted in FIG. 6 in an enlarged form. Also, FIG. 8 is a perspective view schematically showing a heat dissipating member, employed at the battery pack of FIG. 6. Here, the heat dissipating member 130B depicted in FIG. 7 is shown in a sectioned view at one side, different from other components, for the sake of convenience in explanation.

With reference to FIGS. 6 to 8, the heat dissipating member 130B may further include an extending portion 138 extending inward along the outer surface of the cylindrical battery cell 110 from the outer circumference of the circular pad form 130c.

Specifically, the heat dissipating member 130B may be located at one end or the other end of the cylindrical battery cell 110. In addition, the circular pad form 130c may be positioned to be in close contact with one end surface or the other end surface of the cylindrical battery cell 110. Further, the extending portion 138 may extend inward from the outer circumference of the circular pad form 130c along the outer surface of the battery can 20 in the left and right direction W (see FIG. 2) and in the vertical direction.

In addition, a fixing protrusion 132 may be formed at the inner side of the heat dissipating member 130B to protrude inward with a recessed size of the clamping portion 50 of the battery can 20. Moreover, the fixing protrusion 132 may extend in a linear shape along the inner surface of the heat dissipating member 130B. Also, the fixing protrusion 132 of the heat dissipating member 130B may be formed to be inserted into the clamping portion 50 recessed into the battery can 20.

For example, as shown in FIG. 7, the heat dissipating member 130B may have an extending portion 138 extending from the heat dissipating portion 124 to cover the clamping portion 50 of the battery can 20. In addition, the fixing protrusion 132 protruding inward may be formed on the inner side surface of the extending portion 138 to be inserted into and fixed to the clamping portion 50.

That is, the extending portion 138 of the heat dissipating member 130B may be configured to cover the one end or the other end of the battery can 20 so that the fixing protrusion 132 is fitted into the recessed structure of the clamping portion 50.

Thus, according to this configuration of the present disclosure, since the fixing protrusion 132 is formed on the heat dissipating member 130B, the heat dissipating member 130B may effectively increase the contact area with the outer surface of the cylindrical battery cell 110, thereby maximizing the heat dissipating effect. Moreover, since the fixing protrusion 132 of the heat dissipating member 130B is inserted into the clamping portion 50 of the battery can 20, the heat dissipating member 130B may be easily fixed to one side or the other side of the cylindrical battery cell 110, and a fixing member or an adhesive is not separately required, thereby effectively enhancing the process efficiency.

Meanwhile, with reference to FIGS. 1 and 2 again, the battery pack 100 may further include a protective circuit module 160.

Specifically, the protective circuit module 160 may include a printed circuit board 162 having a conductive wire pattern formed thereon and a voltage sensing unit 164.

Here, the voltage sensing unit 164 may be configured to measure a voltage of the plurality of cylindrical battery cells 110. Specifically, the voltage sensing unit 164 may be formed such that one end is electrically connected to the printed circuit board 162 and the other end is in contact with the sensing portion 144 of the bus bar plate 120.

In addition, the voltage sensing unit 164 may be made of an electrically conductive material at least partially. Moreover, the voltage sensing unit 164 may be shaped to extend in close contact with the outer surface of the cylindrical battery cell 110. At this time, the voltage sensing unit 164 may be partially covered with an insulating coating material.

For example, as shown in FIG. 2, the battery pack 100 may include five voltage sensing units 164 electrically connected to the printed circuit board 162. Further, each of the five voltage sensing units 164 may be formed such that one end is electrically connected to the printed circuit board 162 and the other end is in contact with a portion of the bus bar plate 120. In addition, each of the five voltage sensing units 164 may extend and bend in close contact with the outer surface of the cylindrical battery cell 110.

Further, the sensing portion 144 may be connected to or integrated with the heat dissipating portion 124 (see FIG. 4) of the bus bar plate 120 by welding. For example, the sensing portion 144 may have a bent shape to be connected from the heat dissipating portion 124 of the bus bar plate 120.

In addition, the bus bar plate 120 may have a sensing portion 144 formed to electrically connect with the conductive wire of the voltage sensing unit 164. Further, the sensing portion 144 may be shaped to protrusively extend outward from a portion of the outer circumference of the heat dissipating portion 124. Also, the sensing portion 144 may extend along the outer surface of the battery can 20 to utilize the inner space.

More specifically, the sensing portion 144 may extend toward the central direction along the outer surface of the battery can 20 from one end surface at which the first electrode terminal 111a of the cylindrical battery cell 110 is formed or the other end surface at which the second electrode terminal 111b is formed.

For example, as shown in FIG. 1, when viewed in the F direction, the protective circuit module 160 may be provided at a left side of the plurality of cylindrical battery cells 110. In addition, the protective circuit module 160 may include the printed circuit board 162 and five voltage sensing units 164. Moreover, the five voltage sensing units 164 may be formed to extend along the outer surface of the battery can 20 so as to be electrically connected to the sensing portion 144 provided at the bus bar plate 120.

Thus, according to this configuration of the present disclosure, since the voltage sensing unit 164 is formed to extend along the upper surface or the lower surface of the cylindrical battery cell 110, it is possible to effectively utilize the narrow inner space of the battery pack 100.

Meanwhile, the terms indicating directions such as upper, lower, left, right, front and rear are used in this specification, these terms are just for convenience of description and can be changed according to a location of a subject to be observed or a location of an absorber, as obvious to those skilled in the art.

Figure 9:
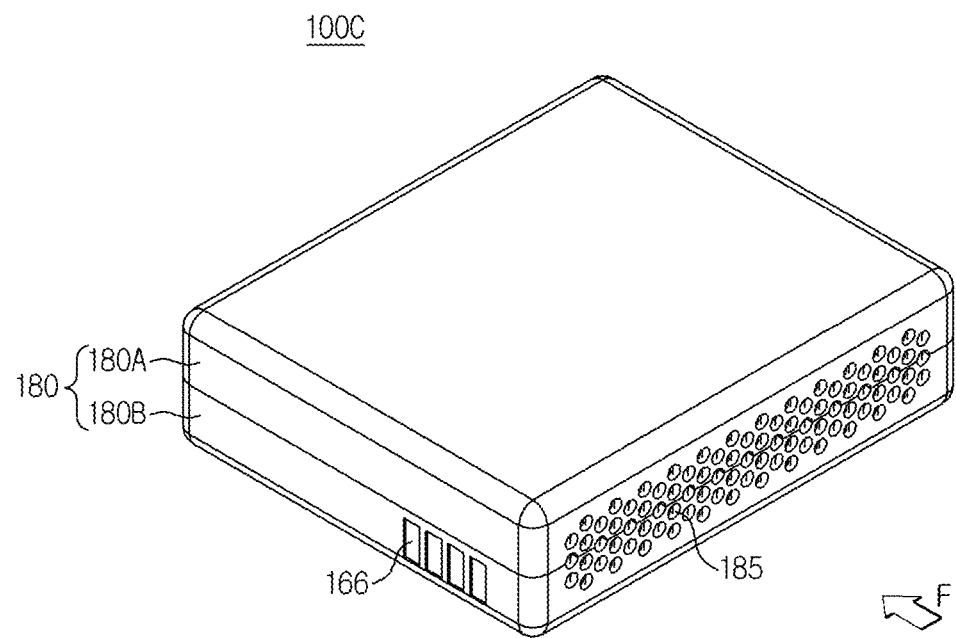
FIG. 9 is a perspective view schematically showing a battery pack according to still another embodiment of the present disclosure.

FIG. 9 is a perspective view schematically showing a battery pack according to still another embodiment of the present disclosure. Also, FIG. 10 is an exploded perspective view schematically showing components of the battery pack according to still another embodiment of the present disclosure.

Figure 10:
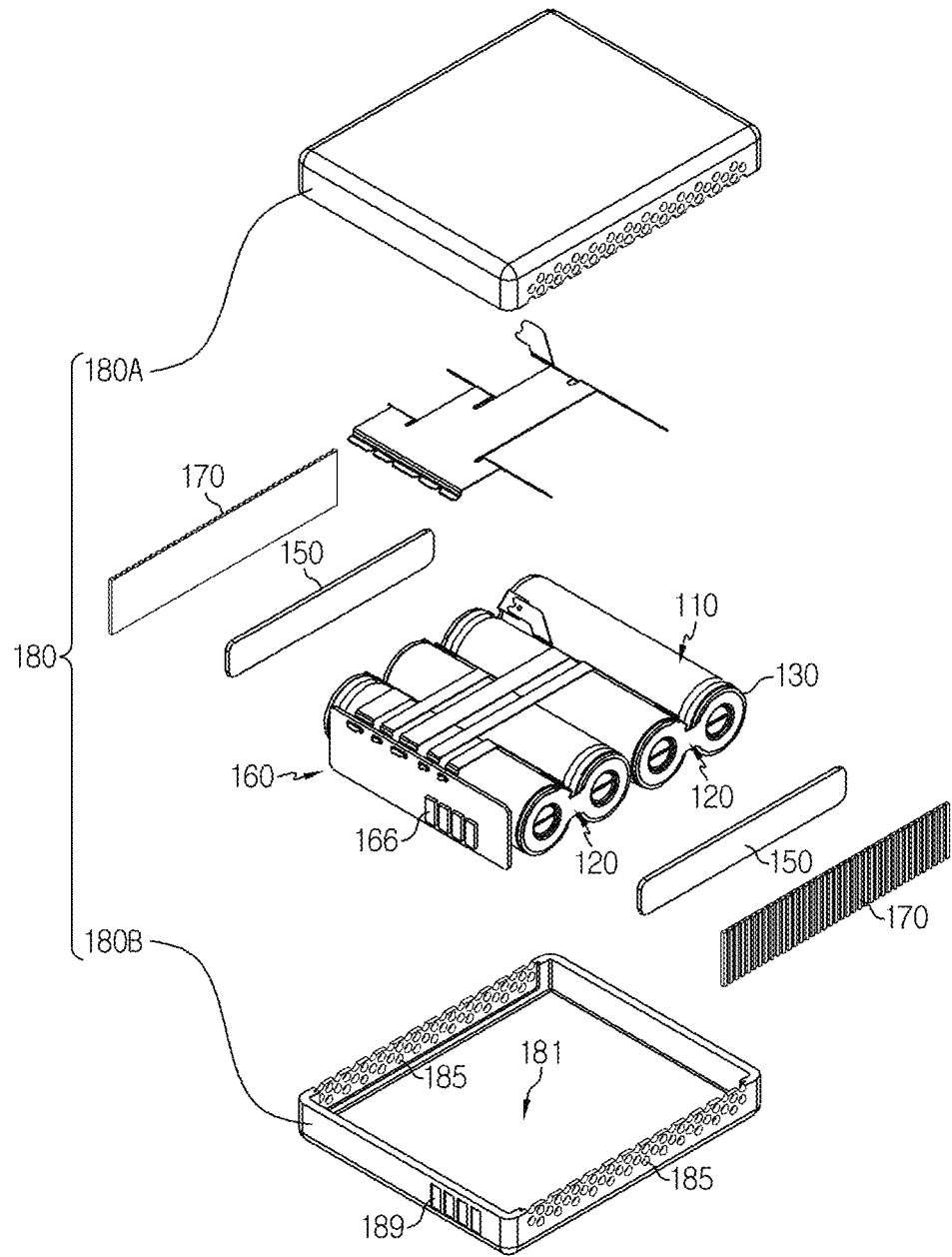
FIG. 10 is an exploded perspective view schematically showing components of the battery pack according to still another embodiment of the present disclosure.

With reference to FIGS. 9 and 10, the battery pack 100C according to still another embodiment of the present disclosure may further include a pack case 180, a heat dissipating plate 170, and an insulating pad 150. Specifically, the pack case 180 may be configured integrally or may be configured by coupling two members. For example, as shown in FIG. 10, the pack case 180 may include an upper case 180A and a lower case 180B. That is, the pack case 180 may be configured by coupling the upper case 180A and the lower case 180B with each other, and an empty space may be formed inside the pack case 180 to receive components such as the plurality of cylindrical battery cells 110 and the protective circuit module 160.

In addition, the pack case 180 may include a receiving portion 181 having an empty space formed therein to receive the cylindrical battery cells 110 therein. For example, as shown in FIG. 10, the receiving portion 181 having an empty space capable of receiving four cylindrical battery cells 110 may be formed inside the pack case 180.

Further, the pack case 180 may have an exposing portion 185 in which a plurality of openings are formed to expose the inside of the receiving portion 181 to the outside. Specifically, the exposing portion 185 may be formed at one side or both sides of the pack case 180. For example, as shown in FIG. 2, the exposing portion 185 may be formed at a side of the front and rear of the pack case 180 when viewed in the F direction.

Moreover, the heat dissipating plate 170 may be configured in a plate form made of a thermally conductive material. For example, the thermally conductive material may be a metal including aluminum, copper, and the like.

In addition, the heat dissipating plate 170 may be inserted into and fixed to a portion of the pack case 180. Specifically, the heat dissipating plate 170 may be formed to be inserted into the pack case 180 by means of insert-injection molding. For example, if the pack case 180 is made by casting, the heat dissipating plate 170 may be disposed in a mold in advance, and a molten material may be injected into the pack case 180 and then cured so as to provide the heat dissipating plate 170 inserted into the pack case 180.

Also, the heat dissipating plate 170 may be configured such that at least a portion thereof is exposed to the outside through the exposing portion 185 of the pack case 180. Specifically, a periphery of the plate form of the heat dissipating plate 170 may be inserted into the outer circumference of the exposing portion 185 of the pack case 180, and the remaining portion thereof may be exposed to the outside through the exposing portion 185.

Further, the protective circuit module 160 may further include external input/output terminals 166 (see FIG. 10) configured to be electrically connected to an external device. In addition, the pack case 180 may have input/output portions 189 opened to expose the external input/output terminals 166 to the outside.

Figure 11:
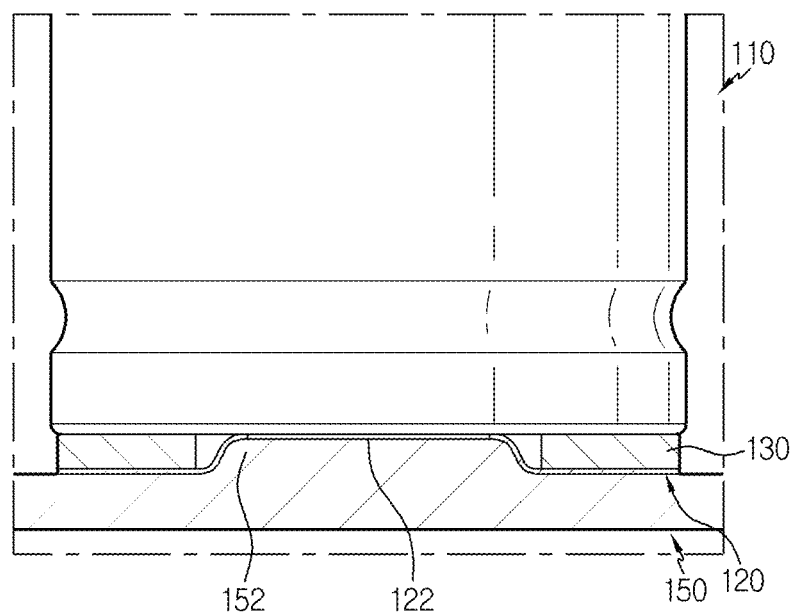
FIG. 11 is a plane view schematically showing a portion of the battery pack according to still another embodiment of the present disclosure.

FIG. 11 is a plane view schematically showing a portion of the battery pack according to still another embodiment of the present disclosure.

With reference to FIG. 11 along with FIG. 6, the battery pack 100C of FIG. 9 may further include an insulating pad 250, compared to the battery pack 100 of FIG. 2. In addition, an insert portion 152 protruding inward to contact the connection portion 122 of the bus bar plate 120 may be formed at an inner surface of the insulating pad 250, which faces the bus bar plate 120. Also, the insert portion 152 may have a protruding shape corresponding to the inwardly recessed shape of the connection portion 122. That is, the insert portion 152 formed at the insulating pad 250 may be inserted into and positioned on the outer surface of the connection portion 122 of the bus bar plate 120.

Further, the insulating pad 150 may be configured such that the outer surface thereof contacts the inner surface of the heat dissipating plate 170. Also, the inner surface of the insulating pad 150 may be positioned in contact with the outer surface of the bus bar plate 120. That is, the insulating pad 150 may be configured for electrical insulation between the bus bar plate 120 and the heat dissipating plate 170.

In addition, the insulating pad 150 may include a material with high thermal conductivity at least partially. For example, the material with high thermal conductivity may be a silicone polymer.

Thus, according to this configuration of the present disclosure, since the insulating pad 150 including the electrically insulating material is interposed between the bus bar plate 120 and the heat dissipating plate 170, the heat generated at the joining portion of the bus bar plate 120 and the electrode terminal 111, which generates relatively high heat, may be effectively transferred to the heat dissipating plate 170. Accordingly, the cooling effect of the battery pack 100C may be further enhanced.

Meanwhile, an electronic device (not shown) according to the present disclosure may include the battery pack 100. For example, the battery pack 100 may be received inside an exterior case of the electronic device. In addition, the electronic device may be a moving means such as an electric bicycle, or may be an electric tool or the like.

Further, a vehicle (not shown) according to the present disclosure may include the battery pack 100. For example, the battery pack 100 may be mounted to sound equipment or video equipment included in the vehicle. Also, the vehicle may be an electric vehicle.

Meanwhile, the terms indicating directions such as upper, lower, left, right, front and rear are used in this specification, these terms are just for convenience of description and can be changed according to a location of a subject to be observed or a location of an absorber, as obvious to those skilled in the art.

It will be apparent to those skilled in the art that various modifications and variations can be made in the battery pack having a heat dissipating member of the present disclosure without departing from the technical idea or scope of the disclosure. Thus, it is intended that the present disclosure cover the modifications and variations of this disclosure provided they come within the scope of the appended claims and their equivalents.

| Reference Signs | |
|---|---|
| 100: battery pack | 110: battery cell |
| 111: electrode terminal | 111a: first electrode terminal |
| 111b: second electrode terminal | S1: slit |
| 120: bus bar plate | 122: connection portion |
| 124: heat dissipating portion | 130: heat dissipating member |
| 136: heat-resisting portion | 137: heat-absorbing portion |
| 138: extending portion | 144: sensing portion |
| 150: insulating pad | 160: protective circuit module |
| 162: printed circuit board | 164: voltage sensing unit |

What is claimed is:

1. A battery pack, comprising:
a plurality of battery cells each having electrode terminals formed thereon;
a bus bar plate having a connection portion protrusively extending toward a first electrode terminal of a first battery cell of the battery cells to contact the first electrode terminal to be electrically connected to the first electrode terminal; and
a heat dissipating member between the bus bar plate and the first battery cell and having a connection hole through which the connection portion of the bus bar plate is connected to the first terminal,
wherein the heat dissipating member has a circular pad form, and
wherein the heat dissipating member includes:

a heat-resisting portion adjacent to the connection hole and having a heat-resisting material; and a heat-absorbing portion around the heat-resisting portion and having a heat-absorbing material.

2. The battery pack according to claim 1, wherein the first battery cell includes a cylindrical battery cell having the first electrode terminal and a second electrode terminal with different polarities respectively formed at both end surfaces thereof, and wherein the heat dissipating member is provided in plural, and the plurality of heat dissipating members are respectively located at both ends of the battery cell at which the first electrode terminal and the second electrode terminal are provided.

3. The battery pack according to claim 2, wherein the bus bar plate includes a heat dissipating portion extending outward from an outer circumference of the connection portion to face an outer surface of the heat dissipating member.

4. The battery pack according to claim 1, wherein the heat-resisting portion has a circular pad form, and the heat-absorbing portion has a circular pad form.

5. The battery pack according to claim 4, wherein the heat dissipating member further includes an extending portion extending inward from an outer circumference of the circular pad form along an outer surface of the cylindrical battery cell.

6. The battery pack according to claim 3, wherein the battery pack further comprises a protective circuit module, wherein the protective circuit module includes:

a printed circuit board on which a conductive wire pattern is disposed; and a voltage sensing unit having a conductive wire to measure a voltage of the first battery cell, and wherein the bus bar plate includes a sensing portion electrically connected to the conductive wire of the voltage sensing unit and protrusively extending outward from a portion of an outer circumference of the heat dissipating portion.

7. The battery pack according to claim 1, wherein the connection portion has a slit elongated in one direction.

8. The battery pack according to claim 1, further comprising:

an insulating pad, including an electrically insulating material, in close contact with an outer surface of the bus bar plate.

9. An electronic device, comprising the battery pack according to claim 1.

10. A vehicle, comprising the battery pack according to claim 1.

* * * * *